United States Patent
Niwa et al.

(10) Patent No.: US 10,030,983 B2
(45) Date of Patent: Jul. 24, 2018

(54) SUPPORT POINT MANAGEMENT SYSTEM, METHOD, AND PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Toshiaki Niwa, Okazaki (JP); Tomoki Kodan, Nagoya (JP); Kuniaki Tanaka, Nagoya (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/026,149

(22) PCT Filed: Sep. 16, 2014

(86) PCT No.: PCT/JP2014/074371
§ 371 (c)(1),
(2) Date: Mar. 30, 2016

(87) PCT Pub. No.: WO2015/060039
PCT Pub. Date: Apr. 30, 2015

(65) Prior Publication Data
US 2016/0245658 A1  Aug. 25, 2016

(30) Foreign Application Priority Data
Oct. 21, 2013  (JP) .................... 2013-218200

(51) Int. Cl.
*G05D 1/02*  (2006.01)
*G06F 17/10*  (2006.01)
(Continued)

(52) U.S. Cl.
CPC ............... *G01C 21/32* (2013.01); *B60T 7/18* (2013.01); *B60T 8/172* (2013.01); *G01C 21/26* (2013.01);
(Continued)

(58) Field of Classification Search
CPC ........... B60T 7/18; B60T 8/172; G01C 21/26; G08G 1/0967; G08G 1/096741; G08G 1/096775
(Continued)

(56) References Cited

U.S. PATENT DOCUMENTS

2008/0059055 A1* 3/2008 Geelen .................. G01C 21/32
701/533
2008/0065327 A1* 3/2008 Sobue .................... G01C 21/32
701/431

FOREIGN PATENT DOCUMENTS

JP   2008-070149 A   3/2008
JP   2011-227833 A   11/2011
JP   2013-114365 A   6/2013

OTHER PUBLICATIONS

Oct. 21, 2014 Search Report issued in International Patent Application No. PCT/JP2014/074371.

* cited by examiner

*Primary Examiner* — Maceeh Anwari
(74) *Attorney, Agent, or Firm* — Oliff PLC

(57) ABSTRACT

Support point management systems, methods, and programs acquire a support point registered as a subject of deceleration support and exclude the support point as the subject of deceleration support in a case a vehicle travels on a new road after having traveled through the support point without deceleration at the support point.

8 Claims, 3 Drawing Sheets

(51) Int. Cl.
*G06G 7/78* (2006.01)
*G01C 21/32* (2006.01)
*B60T 7/18* (2006.01)
*G08G 1/0967* (2006.01)
*B60T 8/172* (2006.01)
*G01C 21/26* (2006.01)

(52) U.S. Cl.
CPC ..... *G08G 1/0967* (2013.01); *G08G 1/096741* (2013.01); *G08G 1/096775* (2013.01); *B60T 2210/36* (2013.01)

(58) Field of Classification Search
USPC ........................................................ 701/300
See application file for complete search history.

FIG. 2A
| LEARNING INFORMATION | TRAVEL LOG | | | | | | | |
|---|---|---|---|---|---|---|---|---|
| | LATEST | ONE TIME BEFORE | TWO TIMES BEFORE | THREE TIMES BEFORE | FOUR TIMES BEFORE | FIVE TIMES BEFORE | ------------ | 20 TIMES BEFORE |
| LOCATION OF DECELERATION POINT | PASS | PASS | 252m | 238m | PASS | 240m | ------------ | 260m |
| NEW ROAD FLAG | ON | ON | OFF | OFF | OFF | OFF | ------------ | OFF |
| LOCATION OF SUPPORT POINT | 256m (DISTANCE FROM TERMINAL NODE) | | | | | | | |
| TARGET FLAG | OFF | | | | | | | |
| ROAD SECTION | $R_1$ | | | | | | | |
| TARGET VEHICLE SPEED | 0 km/hour | | | | | | | |
FIG. 2B
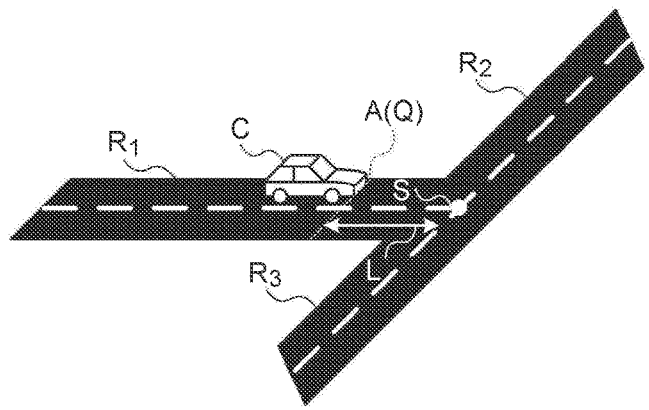
FIG. 2C
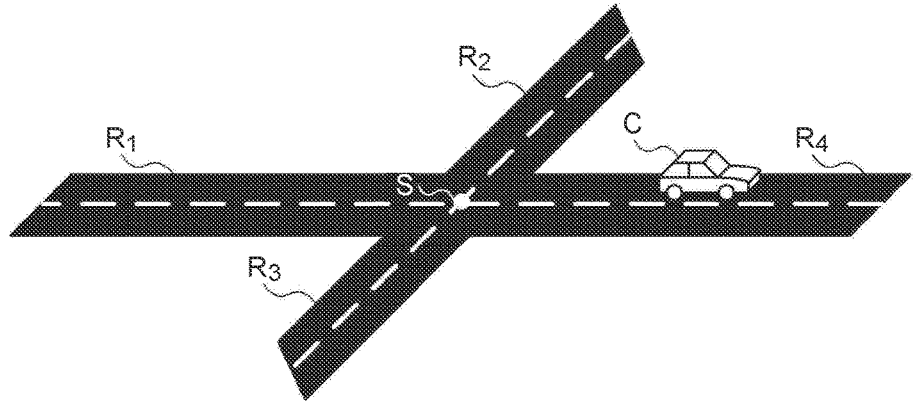

SUPPORT POINT MANAGEMENT SYSTEM, METHOD, AND PROGRAM

TECHNICAL FIELD

Related technical fields include support point management systems, methods, and programs for managing a point where deceleration support is performed.

BACKGROUND ART

There is known a technique that a point where a deceleration operation is performed for predetermined L times or more is registered as a deceleration point for which a deceleration operation is to be learned. See Japanese Patent Application Publication No. 2011-227833 (JP 2011-227833 A). With this technique, a deceleration operation at a deceleration point where a deceleration operation is frequently performed can be learned so that deceleration support can be performed at the deceleration point.

SUMMARY

However, in a possible case, although a deceleration operation is frequently performed at a deceleration point at a certain period of time, if the shape of a road is changed, the necessity for performing deceleration at the deceleration point might decrease. In such a case, although a driver does not intend to perform deceleration, deceleration support is unintentionally performed.

Exemplary embodiments of the broad inventive principles described herein address such a problem as described above, and have an object of providing a technique of avoiding unnecessary execution of deceleration support.

Exemplary embodiments provide systems, methods, and programs that acquire a support point registered as a subject of deceleration support; and exclude the support point as the subject of deceleration support in a case a vehicle travels on a new road after having traveled through the support point without deceleration at the support point.

In the support point management system, method, and program described above, in a case where a vehicle travels on a new road after having traveled through a support point without deceleration at the support point, it is assumed that the necessity for deceleration at the support point has decreased because of the construction of the new road. That is, deceleration needs to be performed for the vehicle to exit to an existing road before the construction of the new road, whereas after the construction of new road, deceleration does not need to be performed anymore because the vehicle can exit to the new road. Exclusion of such a support point as the subject of deceleration support can avoid unnecessary execution of deceleration support.

BRIEF DESCRIPTION OF THE DRAWINGS

FIG. 2A is a diagram showing learning information, and FIGS. 2B and 2C schematically illustrate roads.

DETAILED DESCRIPTION OF EXEMPLARY EMBODIMENTS

Figure 1:
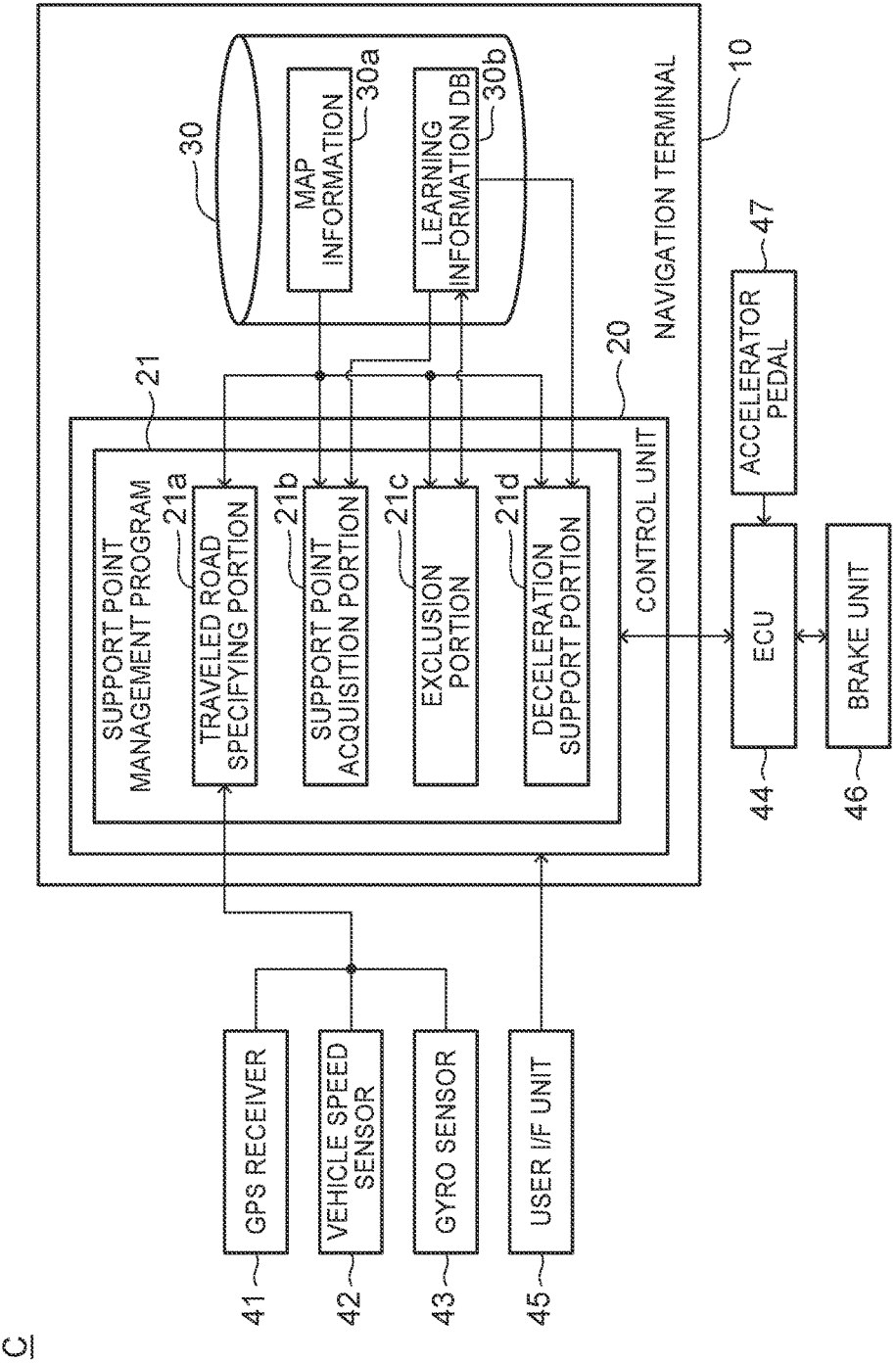
FIG. 1 is a block diagram of a support point management system.
Figure 3:
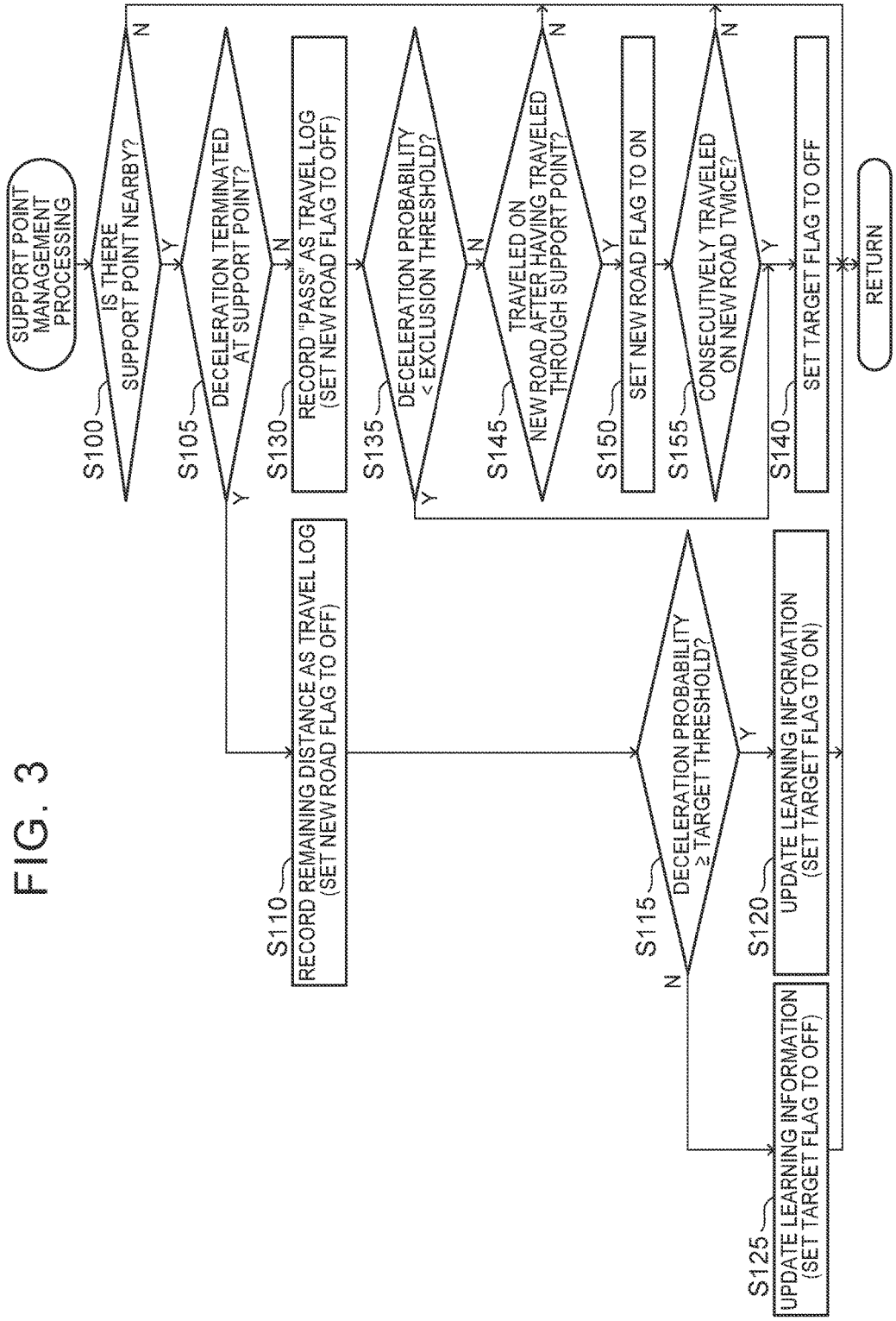
FIG. 3 is a flowchart of a support point management processing.

An embodiment will be described in the following order:
(1) Configuration of a support point management system;
(2) Support point management processing; and
(3) Other embodiments.

(1) Configuration of Support Point Management System

A support point management system is implemented by a navigation terminal 10 mounted on a vehicle C. The navigation terminal 10 includes a control unit 20 including a CPU, a RAM, or a ROM, a storage medium 30, and the like. (As used herein the term "storage medium" is not intended to encompass transitory signals.) The control unit 20 executes programs stored on the storage medium 30 or the ROM. In this embodiment, as one of the programs, the control unit 20 performs a support point management program 21.

The vehicle C includes a GPS receiver 41, a vehicle speed sensor 42, a gyro sensor 43, an electronic control unit (ECU) 44, a user I/F unit 45, a brake unit 46, and an accelerator pedal 47. The GPS receiver 41 receives radio waves from a GPS satellite, and outputs a signal for calculating a current location of the vehicle C to the control unit 20 through an interface (not illustrated). The vehicle speed sensor 42 outputs a signal corresponding to a rotation speed of wheels included in the vehicle C. The control unit 20 acquires the signal through the interface (not illustrated) and acquires a vehicle speed. The gyro sensor 43 detects an angular acceleration when the vehicle C turns within a horizontal plane, and outputs a signal corresponding to the orientation of the vehicle C. The control unit 20 acquires the signal and acquires a traveling direction of the vehicle C.

In the storage medium 30, map information 30a is recorded. The map information 30a includes node data indicating, for example, a location of a node set on a road on which the vehicle C travels, shape interpolation data indicating, for example, a location of a shape interpolation point for specifying the shape of a road between the nodes, and link data indicating a link between the nodes, for example.

An ECU 44 is a circuit for controlling the vehicle C. The ECU 44 according to this embodiment acquires a signal indicating a depression amount of the accelerator pedal 47. The ECU 44 outputs the signal indicating the depression amount of the accelerator pedal to the control unit 20. The ECU 44 controls the brake unit 46. The brake unit 46 includes a brake device for braking the vehicle C, a control circuit for the brake device, a brake pedal, and the like. The brake device may generate a braking force by a friction brake, may generate a braking force by an engine brake, or may generate a braking force by a regenerative brake.

The user I/F unit 45 is an interface unit for receiving an instruction of a driver and providing various types of information to the driver, and includes a display portion that is composed of a touch panel display (not illustrated) and that also serves as an input portion and an output part for outputting sound such as a speaker. The control unit 20 can display a current location of the vehicle C and a map around the current location to the user I/F unit 45 by using the function of the support point management program 21. That is, the control unit 20 acquires the current location of the vehicle C and, based on the map information 30a, generates an image indicating a map around the current location to output the image to the user I/F unit 45. Consequently, the display portion of the user I/F unit 45 displays the map including the current location.

The support point management program 21 includes a traveled road specifying portion 21a, a support point acquisition portion 21b, an exclusion portion 21c, and a deceleration support portion 21d.

The traveled road specifying portion 21a is a module that causes the control unit 20 to execute a function of specifying a traveled road section on which the vehicle C is traveling, based on a traveling path of the vehicle C and the map information 30a. The control unit 20 specifies a road section on which the vehicle C is travelling by known map matching, by using the function of the traveled road specifying portion 21a. The control unit 20 acquires the traveling path of the vehicle C based on output signals from the vehicle speed sensor 42, the gyro sensor 43, the GPS receiver 41, and the like, and acquires the shape of a road section based on node data and link data in the map information 30a. The control unit 20 acquires a matching degree with the traveling path for each shape of road sections located within a predetermined distance from the vehicle C, and specifies a road section having the highest matching degree as a traveled road section on which the vehicle C is traveling. If the highest matching degree is less than a threshold, the control unit 20 determines that a traveled road section cannot be specified. The control unit 20 specifies a current location of the vehicle C on a traveled road section.

The support point acquisition portion 21b is a module that causes the control unit 20 to execute a function of acquiring a support point registered as a target of deceleration support. The control unit 20 acquires a support point effectively registered as a target of deceleration support in learning information DB 30b of the storage medium 30 by using the function of the support point acquisition portion 21b.

FIG. 2A shows learning information recorded for each support point in the learning information DB 30b. The learning information is information recorded such that a location of a road section including a support point, a location of the support point on the road section, a target flag, a travel log, and a target vehicle speed are associated with each other for each support point. The support point is a point at which deceleration support is terminated and has been set based on a deceleration point at which deceleration of the vehicle C has been terminated. The expression that deceleration is terminated refers to a case where the vehicle C stops or a case where the vehicle C accelerates again. The case where the vehicle C stops is a case where the vehicle speed decreases to a predetermined threshold (e.g., 3 km/hour) or less. The case where the vehicle C accelerates again is a case where the vehicle speed has decreased by a predetermined degree (e.g., 5 km/hour) or more and then the accelerator pedal is depressed.

The target flag is a frag that is set to ON in a case where the support point is a target of deceleration support and is set to OFF in a case where the support point is excluded as the target of deceleration support. The travel log is information that is recorded every time the vehicle C travels through the support point. In a case where the vehicle C decelerates at the support point, a remaining distance indicating a location of a deceleration point at which the deceleration is terminated is recorded as a travel log. The remaining distance is a distance from the deceleration point and the support point to a terminal node of a road section including the deceleration point and the support point. The remaining distance may be a linear distance between a location of the terminal node of the road section and the deceleration point or the support point, or a distance along a road on the road section. On the other hand, if deceleration is not terminated at the support point, "pass" is recorded as a travel log. In this embodiment, travel logs can be recorded for 20 times of travel. If the number of times of travel at a single support point exceeds 20 times, a latest travel log is recorded, and an oldest travel log is deleted instead.

FIG. 2B schematically illustrates a state in which deceleration of the vehicle C is terminated at a deceleration point A on a road section $R_1$. In this embodiment, in a case where the deceleration point A is located in a predetermined error range (less than or equal to 15 m forward and backward) of a support point Q already recorded in the learning information, it is assumed that deceleration of the vehicle C has been terminated at the support point Q. In a case where the deceleration point A is within the error range of the existing support point Q, a remaining distance L indicating a location of the deceleration point A is recorded as a travel log in the learning information on the exiting support point Q. In the case where the remaining distance L indicating the location of the deceleration point A is recorded as a travel log as described above, a location corresponding to a median of remaining distances L indicating locations of a plurality of deceleration points A is updated as a location of the support point Q. The median refers to an N/2-th (where fractional portions thereof are rounded up or down) largest remaining distance L among remaining distances L indicating N (where N is a natural number of 2 or more) recorded deceleration points A. On the other hand, in a case where the deceleration point A is not within the error range of the exiting support point Q, new learning information in which a deceleration point A is a support point Q is generated and is added to the learning information DB 30b.

The number of remaining distances L indicating locations of deceleration points A recorded as travel logs refers to the number of times of deceleration at the support point Q. The number of times of "pass" recorded as travel logs refers to the number of times of passage through the support point Q. A value obtained by diving the number of times of deceleration by a sum of the number of times of deceleration and the number of times of passage refers to a deceleration probability at the support point Q.

The target vehicle speed is a vehicle speed that is to be obtained by deceleration support performed at the support point Q. The deceleration support is performed in such a way that the vehicle speed at the support point Q reaches the target vehicle speed. In this embodiment, the target vehicle speed is an average value of vehicle speeds when past deceleration at a support point Q (a deceleration point A within the error range from the support point Q) is terminated.

The exclusion portion 21c is a module that causes the control unit 20 to execute a function of excluding a support point Q as a subject of deceleration support in a case where the vehicle C travels on a new road after having traveled through the support point Q without deceleration at the support point Q. If deceleration of the vehicle C is not terminated at a point within an error range (within 15 m forward and backward) of the support point Q that is a subject of deceleration support, the control unit 20 determines that deceleration is not terminated at the support point Q by using the function of the exclusion portion 21c. If a traveled road section is not specified by using map matching of the traveled road specifying portion 21a in a stage where the vehicle C has traveled a predetermined distance (e.g., 100 m) after having passed through the support point Q, the control unit 20 determines that the vehicle C is traveling on the new road. The control unit 20 sets a target flag associated with the support point Q in the learning information to OFF to exclude the support point Q as the subject of deceleration support by using the function of the exclusion portion 21c.

The control unit 20 excludes the support point Q as the subject of deceleration support by using the function of the exclusion portion 21c in a case where the number of times of travel of the vehicle C on the new road after the support point Q without deceleration at the support point Q reaches a threshold or more. In this embodiment, in a case where the vehicle C has consecutively traveled on the new road after having traveled through the support point Q without deceleration at the support point Q twice or more, the control unit 20 excludes the support point Q as the subject of the deceleration support. Only in a case where the vehicle C travels on the new road after having traveled through the support point Q without deceleration at the support point Q, the control unit 20 sets a new road flag to ON in the travel log in the learning information shown in FIG. 2B. On the other hand, in a case where the vehicle C decelerates at the support point Q or a case where the vehicle C travels on a road (a road section defined by the map information 30*a*) that is not the new road after having traveled through the support point Q without deceleration at the support point Q, the control unit 20 sets the newly-provided road flag to OFF in the travel log. The control unit 20 excludes the support point Q as the subject of deceleration support by using the function of the exclusion portion 21*c* in a case where the new road flag in the latest travel log is ON and the new road flag in the travel log before last is ON.

The deceleration support portion 21*d* is a module that causes the control unit 20 to execute a function of performing deceleration support for deceleration at the support point Q. The control unit 20 acquires the support point Q as a subject of deceleration support from the learning information DB 30*b*, and performs driving support in a case where the vehicle C travels on a road before the support point Q, by using the function of the deceleration support portion 21*d*. Specifically, the control unit 20 sets a control section in which the support point Q is a terminal point at a location before the support point Q and sets a vehicle speed of deceleration control in such a way that the vehicle speed decreases from the current vehicle speed to a target vehicle speed in the control section. For example, the vehicle speed of deceleration control is set in such a way that the vehicle speed reaches a target vehicle speed at the support point Q in a case where deceleration is performed at an ideal deceleration rate. The ideal deceleration rate (e.g., 0.2 G) is an ideal deceleration rate that is set based on a ride comfort of a passenger, a charging efficiency of regenerated energy, braking performance of the vehicle C, and the like. The deceleration rate refers to an absolute value of negative acceleration. The length of the control section is determined based on a current vehicle speed, a target vehicle speed, and an ideal deceleration rate. The control unit 20 causes the brake unit 46 of the vehicle C to generate a braking force in such a way that the vehicle speeds reaches a predetermined vehicle speed when the vehicle C enters the control section by using the function of the deceleration support portion 21*d*.

In the embodiment described above, in a case where the vehicle C travels on the new road after having traveled through the support point Q without deceleration at the support point Q, it can be assumed that the construction of the new road reduces the necessity for deceleration at the support point Q. That is, it can be assumed that deceleration needed to be performed for the vehicle C to exit to an existing road before the construction of the new road, whereas after the construction of the new road, deceleration does not need to be performed anymore because the vehicle C can exit to the new road. In the example illustrated in FIG. 2B, the road section $R_1$ including the support point Q is connected to a left-turn road section $R_2$ and a right-turn road section $R_3$, and the vehicle C needs to decelerate at the support point Q in preparation for left turn or right turn. On the other hand, in the example illustrated in FIG. 2C, the road section $R_1$ including the support point Q is also connected to a new road section $R_4$ to which the vehicle C can travel straight from the road section $R_1$, as well as the left-turn road section $R_2$ and the right-turn road section $R_3$. Link data on the new road section $R_4$ has not been recorded in the map information 30*a* yet, and map matching cannot be performed. In such a situation, deceleration support at the support point Q is unnecessary. The support point Q in such a situation is excluded as the subject of deceleration support so that execution of unnecessary deceleration support can be avoided.

In a case where a traveled road section is not specified, link data on a road section on which the vehicle C is traveling has not been recorded in the map information 30*a* yet, and thus, it can be determined that the vehicle C is traveling the new road section $R_4$ constructed after creation of the map information 30*a*. In this configuration, it is possible to determine that the vehicle C is traveling on the new road section $R_4$ without waiting for provision of the map information 30*a* in which information on the new road section $R_4$ is recorded. In the case illustrated in FIG. 2C, a matching degree between a traveling path (straight traveling path) in a case where the vehicle C exits from the road section $R_1$ to the new road section $R_4$ and a shape of a road constituted by the road section $R_1$ and the left-turn road section $R_2$ is not greater than or equal to a threshold. Similarly, a matching degree between a traveling path (straight traveling path) in a case where the vehicle C exits from the road section $R_1$ to the new road section $R_4$ and a shape of a road constituted by the road section $R_1$ and the right-turn road section $R_3$ is not greater than or equal to a threshold. Thus, in the case where the vehicle C exits from the road section $R_1$ to the new road section $R_4$, a traveled road section cannot be specified.

The control unit 20 excludes the support point Q as the subject of deceleration support in a case where the number of times of travel of the vehicle C on the new road section $R_4$ after the support point Q becomes a threshold (twice) or more without deceleration at the support point Q. Thus, it is possible to prevent the support point Q from being excluded as the subject of deceleration support in the case of erroneous determination that the vehicle C has traveled on the new road section $R_4$ after having traveled through the support point Q without deceleration at the support point Q because of an unexpected factor. For example, it is possible to prevent the support point Q from being excluded as the subject of the deceleration support in a case where the vehicle C enters a facility near the support point Q without deceleration at the support point Q, for example.

(2) Support Point Management Processing

Next, a support point management processing will be described. The support point management processing is processing performed at every predetermined time cycle or travel distance cycle. In a period in which the support point management processing is performed, the control unit 20 specifies a traveled road section on which the vehicle C is traveling at every predetermined time cycle or travel distance cycle, by using the function of the traveled road specifying portion 21*a*. First, by using the function of the support point acquisition portion 21*b*, the control unit 20 acquires a support point Q from each piece of learning information in the learning information DB 30*b* and determines whether the support point Q is located around the vehicle C or not (step S100). The term "around the vehicle C" refers to the vicinity of the vehicle C on a scheduled traveling route that has been searched for by a known route search technique. The vicinity of the vehicle C on the scheduled traveling route refers to a range within 300 m forward of the current location and within 30 m backward of the current location on the scheduled traveling route. In this embodiment, it is assumed that the vehicle C travels on the traveled road section on the scheduled traveling route.

If it is not determined that the support point Q is located around the vehicle C, the control unit 20 returns to the first step (step S100) of the support point management processing. That is, the control unit 20 waits for a state where the support point Q is located around the vehicle C. On the other hand, if it is determined that the support point Q is located around the vehicle C, the control unit 20 determines whether deceleration of the vehicle C is terminated at the support point Q or not by using the function of the exclusion portion 21*c* (step S105). In a case where deceleration of the vehicle C is terminated within an error range (within 15 m forward and backward of the current location on the scheduled traveling route) of the support point Q, the control unit 20 determines that deceleration of the vehicle C is terminated at the support point Q. In this embodiment, the case where deceleration is terminated is a case where the vehicle speed reaches a predetermined threshold (e.g., 3 km/hour) or less or a case where the vehicle speed decreases by a predetermined amount (e.g., 5 km/hour) or more and then the accelerator pedal is depressed. In step S105, by using the function of the exclusion portion 21*c*, the control unit 20 periodically determines whether deceleration is terminated in a period in which the vehicle C travels within an error range of the support point Q. If it is detected that deceleration is terminated in any of the cycles in the period in which the vehicle C travels within the error range of the support point Q, the control unit 20 determines that deceleration of the vehicle C is terminated at the support point Q.

If it is determined that deceleration of the vehicle C is terminated at the support point Q (Y in step S105), the control unit 20 records a remaining distance L indicating a location of a deceleration point A as a travel log by using the function of the exclusion portion 21*c*, and sets a new road flag to OFF (step S110). The remaining distance L is a distance from the deceleration point A and the support point Q to terminal nodes S of road sections including the deceleration point A and the support point Q. In a case where the sum of the number of remaining distances L each indicating a location of the deceleration point A recorded as a travel log and the number of "pass" has already been 20, the control unit 20 deletes an oldest travel log (remaining distance L or "pass"), and then records the remaining distance L indicating the location of the deceleration point A as a new travel log. In a case where deceleration of the vehicle C is terminated at the support point Q, the control unit 20 sets the new road flag to OFF, irrespective of a road section on which the vehicle C travels after having traveled through the support point Q.

Next, the control unit 20 determines whether the deceleration probability is greater than or equal to a target threshold (e.g., 80%) or not by using the function of the exclusion portion 21*c* (step S115). The deceleration probability is a value obtained by dividing the number of times of deceleration by a sum of the number of times of deceleration and the number of times of passage. The number of times of deceleration is the number of remaining distances L each indicating a location of the deceleration point A recorded as a travel log. The number of times of passage is the number of "pass" recorded as travel logs.

If the deceleration probability is determined to be greater than or equal to the target threshold (Y in step S115), the control unit 20 updates learning information on the support point Q at which deceleration of the vehicle C is terminated in such a way that the target flag is ON, by using the function of the exclusion portion 21*c* (step S120). That is, the control unit 20 updates the location of the support point Q, the target vehicle speed, and the target flag in the learning information. Specifically, the control unit 20 acquires a location corresponding to a median of remaining distances L indicating locations of a plurality of deceleration points A recorded as leaning logs as a location of a new support point Q. The control unit 20 calculates a sum of a value obtained by multiplying a value obtained by reducing 1 (one) from the number of times of deceleration (i.e., the number of times of deceleration—1) by a current target vehicle speed and a vehicle speed when it was determined that deceleration is terminated in step S105. The control unit 20 then divides the sum by the number of times of deceleration, thereby acquiring an updated target vehicle speed. In step S120, the control unit 20 sets a target flag in the learning information to ON. That is, if the target flag is originally OFF, the target flag is switched to ON. If the target flag is originally ON, the target flag is kept ON. In this manner, deceleration support can be performed at the support point Q at which the vehicle C is highly likely to decelerate.

If it is not determined that the deceleration probability is greater than or equal to a target threshold (N in step S115), the control unit 20 updates the learning information by using the function of the exclusion portion 21*c* in such a way that a target flag is OFF for the support point Q at which deceleration of the vehicle C is terminated (step S125). In a manner similar to step S120, the control unit 20 updates the target vehicle speed and the location of the support point Q. In step S125, the control unit 20 sets a target flag in the learning information to OFF. That is, if the target flag is ON, the target flag is switched to OFF. If the target flag is originally OFF, the target flag is kept OFF. Thus, deceleration support is not performed at the support point Q at which the vehicle C is less likely to decelerate.

On the other hand, if it is not determined that deceleration of the vehicle C is not terminated at the support point Q (N in step S105), the control unit 20 records "pass" as a travel log by using the function of the exclusion portion 21*c*, and sets a new road flag to OFF (step S130). If the sum of the number of remaining distances L recorded as travel logs and each indicating a location of the deceleration point A and the number of "pass" is already 20, the control unit 20 deletes the oldest remaining distance L or "pass" and records "pass" as a new travel log. If deceleration of the vehicle C is not terminated at the support point Q, the control unit 20 sets the new road flag to OFF as an initial state.

Then, the control unit 20 determines whether the deceleration probability is less than an exclusion threshold (e.g., 30%) or not by using the function of the exclusion portion 21*c* (step S135). If it is determined that the deceleration probability is less than the exclusion threshold (Y in step S135), the control unit 20 sets, to OFF, a target flag for the support point Q at which deceleration is not performed by using the function of the exclusion portion 21*c* (step S140). That is, if the target flag is ON, the target flag is switched to OFF, and if the target flag is originally OFF, the target flag is kept OFF. Thus, deceleration support is not performed at the support point Q at which the vehicle C is less likely to decelerate. The exclusion threshold that is a deceleration probability in switching a target flag from ON to OFF is smaller than a target threshold that is a deceleration probability in switching a target flag from OFF to ON. Thus, it is possible to prevent a target flag from being switched to ON or OFF frequently in a case where the deceleration probability varies around the threshold.

On the other hand, if it is not determined that the deceleration probability is less than the exclusion threshold (N in step S135), the control unit 20 determines whether the vehicle C has traveled on a new road section after having traveled through the support point Q or not by using the function of the exclusion portion 21c (step S145). Specifically, it is determined that the vehicle C is traveling the new road in a case where a traveled road section cannot be specified by map matching of the traveled road specifying portion 21a at the time when the vehicle C has traveled a predetermined distance (e.g., 100 m) after passing through the support point Q.

If it is not determined that the vehicle C has traveled on a new road section after having traveled through the support point Q (N in step S145), the control unit 20 returns to the first step (step S100) in the support point management processing by using the function of the exclusion portion 21c. That is, "pass" is recorded as a travel log in learning information on the support point Q through which the vehicle C has passed, and the control unit 20 waits for a state where the vehicle C next travels through the support point Q. In this case, a new road flag associated with "pass" as the travel log is kept OFF as the initial state. On the other hand, if it is determined that the vehicle C has traveled on a new road section after having traveled through the support point Q (Y in step S145), the control unit 20 sets, to ON, a new road flag of a travel log for the support point Q at which deceleration was not performed, by using the function of the exclusion portion 21c (step S150).

Thereafter, the control unit 20 determines whether or not the vehicle C has consecutively traveled on a new road after having traveled through the support point Q without deceleration at the support point Q twice or more, by using the function of the exclusion portion 21c (step S155). Specifically, in a case where a new road flag in the latest travel log is ON and a new road flag in the travel log before last is ON, the control unit 20 excludes the support point Q as the subject of deceleration support.

If it is not determined that the vehicle C has consecutively traveled on a new road after having traveled through the support point Q without deceleration at the support point Q twice or more (N in step S155), the control unit 20 returns to the first step (step S100) in the support point management processing. That is, the control unit 20 records "pass" as a travel log in the learning information on the support point Q through which the vehicle C has passed, sets a new road flag on this "pass" to ON, and waits for a state where the vehicle C next travels through the support point Q.

On the other hand, if it is determined that vehicle C has consecutively traveled on a new road after having traveled through the support point Q without deceleration at the support point Q twice or more (Y in step S155), the control unit 20 executes step S140. That is, if the vehicle C has consecutively traveled on a new road after having traveled through the support point Q without deceleration at the support point Q twice or more, a target flag for the support point Q at which deceleration was not performed is set to OFF, irrespective of whether the deceleration probability is less than the exclusion threshold or not. That is, if the vehicle C has consecutively traveled on a new road after having traveled through the support point Q without deceleration at the support point Q twice or more, the control unit 20 promptly sets the target flag for the support point Q to OFF without waiting for a state where the deceleration probability becomes less than the exclusion threshold. Thus, as illustrated in FIG. 2C, the support point Q for the new road section $R_4$ can be promptly excluded as the subject of deceleration support, thereby avoiding unnecessary execution of deceleration support.

(3) Other Embodiments

In a case where the vehicle C has traveled on a new road after having traveled through a support point Q without deceleration at the support point Q even once, the control unit 20 may exclude the support point Q as the subject of deceleration support. In this case, the support point Q for the new road section $R_4$ can be excluded as the subject of deceleration support earlier than the timing in the above embodiment. In a case where the vehicle C travels on the new road section $R_4$ after having traveled through the support point Q without deceleration at the support point Q, the control unit 20 may accept an operation of specifying whether the support point Q is excluded as the subject of the driving support or not.

The control unit 20 may not necessarily determine whether the vehicle C travels on the new road based on a result of map matching. For example, in a case where the navigation terminal 10 receives updated data on the map information 30a from a server in a network, the control unit 20 may associate each piece of link data included in the updated data with date and time of the reception. Then, in a case where the date and time of the reception of the link data associated with a road section traveled on by the vehicle C after the support point Q without deceleration at the support point Q is within a predetermined period from the present, the control unit 20 may exclude the support point Q as the subject of deceleration support.

In the embodiment described above, in the case whether the number of times of travel in which the vehicle C travels on the new road section $R_4$ after having traveled through the support point Q without deceleration at the support point Q is greater than or equal to the threshold (twice), the control unit 20 excludes the support point Q as the subject of deceleration support. However, the threshold may be set in accordance with an operation of a driver. In the embodiment described above, the support point Q is excluded as the subject of deceleration support by setting the target flag to OFF. Alternatively, the control unit 20 may exclude the support point Q as the subject of deceleration support by deleting learning information on the support point Q. In addition, the support point management processing need not necessarily be executed in the navigation terminal 10 mounted on the vehicle C, and may be executed in a server that acquires information indicating a traveling route or a point at which deceleration was performed, for example, from the vehicle C.

The foregoing embodiment is merely an example, and various other embodiments may be employed. Support point acquisition means only needs to acquire a support point registered as a subject of deceleration support, and a support point effectively registered as a subject of deceleration support may be acquired from a storage medium or a communication medium. The support point is a point at which deceleration support is performed. The point at which the deceleration support is performed may be a point at which deceleration support is started or may be a point at which deceleration support is terminated. The support point may be a point learned based on a deceleration history of a vehicle. This is because a traveling route of a driver can be changed by providing a new road even for a support point learned based on the deceleration history. The support point may be a regulation point (e.g., a stop point or a railroad crossing) at which deceleration needs to be performed on a map. This is because even at a point that was set as a regulation point in the past, the regulation point can be abolished in association with the construction of a new road.

Exclusion means only needs to exclude a support point as a subject of deceleration support in a case where a vehicle travels on a new road after having traveled through the support point without deceleration at the support point. The exclusion means may specify a road traveled on by a vehicle at a point of time when the vehicle has traveled a predetermined distance or when a predetermined period has elapsed after passing through a support point, and, if the road is a new road, may determine that the vehicle has traveled on the new road after having traveled through the support point. The exclusion means may acquire a vehicle speed at a point of time when the vehicle has traveled a predetermined distance or when a predetermined period has elapsed after passing through a support point, and, if the vehicle speed is less than or equal to a threshold, may determine that the vehicle is not traveling on the road (new road). Thus, in a case where the vehicle enters a facility after passing through the support point, erroneous determination that the vehicle is traveling on the new road can be avoided.

A new road that can be traveled on by a vehicle after a support point without deceleration at the support point is generally highly likely to be a road to which the vehicle can exit in a straight direction from a road including the support point. This is because deceleration is likely to be performed at the support point in a case where steering operation is necessary for exit to a new road. Thus, in a case where a traveling direction of a vehicle at a time when the vehicle has traveled a predetermined distance or when a predetermined period has elapsed after passing through the support point is shifted from a direction of a road including the support point by a predetermined amount or more, the exclusion means may not exclude the support point as the subject of deceleration support. The deceleration support may be an operation of causing a brake unit of a vehicle to generate a braking force independently of an operation of a driver or an operation of guiding a deceleration timing to the driver. Exclusion of a support point as the subject of deceleration support may be deletion of the support point from database in which the support point is registered or setting a flag indicating that the support point is excluded as the subject of deceleration support instead of being deleted.

In a case where a road traveled on by a vehicle after a support point is a road defined as a new road in map information, the exclusion means may determine that the vehicle has traveled on the new road after having traveled through the support point. For example, in a case where the time when a new road was constructed is recorded in the map information or a case where the time when data associated with the new road is stored in the map information is recorded, it can be determined whether a road being traveled on by the vehicle is a new road or not.

Traveled road specifying means for specifying a traveled road being traveled on by a vehicle based on a traveling path of the vehicle and map information may be further provided so that the exclusion means may determine that the vehicle is traveling on the new road in a case where a traveled road is not specified. In the case where a traveled road is not specified, it can be determined that information on a road traveled on by a vehicle has not been recorded in map information yet and a vehicle is traveling on a new road constructed after creation of the map information. In this configuration, it can be determined that the vehicle is traveling on the new road without waiting for provision of map information in which information on the new road is recorded. The traveled road specifying means may specify a road having a shape matching a traveling path of a vehicle as a traveled road by using known map matching.

The exclusion means may exclude a support point as the subject of deceleration support in a case where the number of times of travel in which a vehicle travels on a new road after having traveled through the support point without deceleration at the support point is greater than or equal to a threshold. Thus, it is possible to prevent a support point from being excluded as the subject of deceleration support in the case of erroneous determination that a vehicle has traveled on a new road after having traveled through the support point without deceleration at the support point due to an unexpected factor. For example, it is possible to prevent the support point from being excluded as the subject of deceleration support in a case where the vehicle enters a facility near the support point, for example.

The technique of managing a support point described herein is also applicable as a program or a method. The system, program, and method as described above may be implemented as a single apparatus, or may be implemented using components shared with respective components provided in a vehicle, and include various aspects. For example, a navigation system, a management system, method, or program for managing travel history information including the apparatus as described above can be provided. Some portions may be implemented as software and other portions may be implemented as hardware, and various such modifications may be made as appropriate. In addition, the above-described systems and/or methods may also be implemented as a storage medium of a program for controlling an apparatus. As a matter of course, the storage medium of software may totally equally be a magnetic storage medium, a magneto-optical storage medium, or any storage medium that may be developed in the future.

The invention claimed is:

1. A support point management system for use with a navigation terminal of a vehicle comprising:
    a memory; and
    a processor programmed to:
        receive sensor data indicating the current position of the vehicle, and sensor data indicating deceleration of the vehicle;
        acquire, from the memory, a support point registered as a target of deceleration support; and
        in a case that the vehicle is determined to have traveled nearby the registered support point:
            record, as travel log information, information indicating whether the vehicle passes through nearby the registered support point without decelerating, or, alternatively, decelerates nearby the registered support point; and
            in the case that the vehicle passes through the registered support point:
                obtain a deceleration probability of the vehicle at the registered support point by dividing the number of times of deceleration nearby the support point in the recorded travel log information, by a sum total of the number of times of deceleration nearby the support point in the recorded travel log information and the number of times of passage through the registered support point without deceleration in the recorded travel log information; and
                in a case that the obtained deceleration probability is less than a threshold exclusion deceleration probability: exclude the registered support point by updating the memory to indicate that the registered support point is no longer the target of deceleration support.

2. The support point management system according to claim 1, wherein the processor is programmed to:
specify a traveled road being traveled on by the vehicle based on a traveling path of the vehicle and map information; and
determine that the vehicle is traveling on the new road in a case where the traveled road is not specified.

3. The support point management system according to claim 2, wherein the processor is further programmed to:
exclude the support point as the subject of deceleration support in a case where a number of times of travel in which the vehicle travels on the new road after having traveled through the support point without deceleration at the support point is greater than or equal to a new road threshold.

4. The support point management system according to claim 1, wherein the processor is programmed to:
exclude the support point as the subject of deceleration support in a case where a number of times of travel in which the vehicle travels on the new road after having traveled through the support point without deceleration at the support point is greater than or equal to a threshold.

5. The support point management system according to claim 1, wherein the processor is further programmed to: in the case that the vehicle passes through the support point and the obtained deceleration probability is not less than the threshold exclusion deceleration probability:
perform map matching to determine whether a traveled road section can be specified by map matching; and
in a case that the traveled road section cannot be specified by the map matching: exclude the support point by updating the memory to indicate that the support point is no longer the target of deceleration support, thereby accounting for new road additions that obviate the need for the registered support point.

6. The support point management system according to claim 5, wherein the case that the traveled road section cannot be specified by the map matching is a case that the traveled road section cannot be specified by the map matching at the time when the vehicle has traveled a predetermined distance after passing through the registered support point.

7. A support point management method for use with a navigation terminal of a vehicle, the method comprising:
receiving sensor data indicating the current position of the vehicle, and sensor data indicating deceleration of the vehicle;
acquiring, from a memory, a support point registered as a target of deceleration support; and
in a case that the vehicle is determined to have traveled nearby the registered support point:
recording, as travel log information, information indicating whether the vehicle passes through nearby the registered support point without decelerating, or, alternatively, decelerates nearby the registered support point; and
in the case that the vehicle passes through the registered support point:
obtaining a deceleration probability of the vehicle at the registered support point by dividing the number of times of deceleration nearby the support point in the recorded travel log information, by a sum total of the number of times of deceleration nearby the support point in the recorded travel log information and the number of times of passage through the registered support point without deceleration in the recorded travel log information; and
in a case that the obtained deceleration probability is less than a threshold exclusion deceleration probability: excluding the registered support point by updating the memory to indicate that the registered support point is no longer the target of deceleration support.

8. A non-transitory computer-readable storage medium storing a computer-executable support point management program for use with a navigation terminal of a vehicle, the computer-executable support point management program, when executed by a computer, causes the computer to:
receive sensor data indicating the current position of the vehicle, and sensor data indicating deceleration of the vehicle;
acquire, from a memory, a support point registered as a target of deceleration support; and
in a case that the vehicle is determined to have traveled nearby the registered support point:
record, as travel log information, information indicating whether the vehicle passes through nearby the registered support point without decelerating, or, alternatively, decelerates nearby the registered support point; and
in the case that the vehicle passes through the registered support point:
obtain a deceleration probability of the vehicle at the registered support point by dividing the number of times of deceleration nearby the support point in the recorded travel log information, by a sum total of the number of times of deceleration nearby the support point in the recorded travel log information and the number of times of passage through the registered support point without deceleration in the recorded travel log information; and
in a case that the obtained deceleration probability is less than a threshold exclusion deceleration probability: exclude the registered support point by updating the memory to indicate that the registered support point is no longer the target of deceleration support.

* * * * *